Patented June 17, 1930

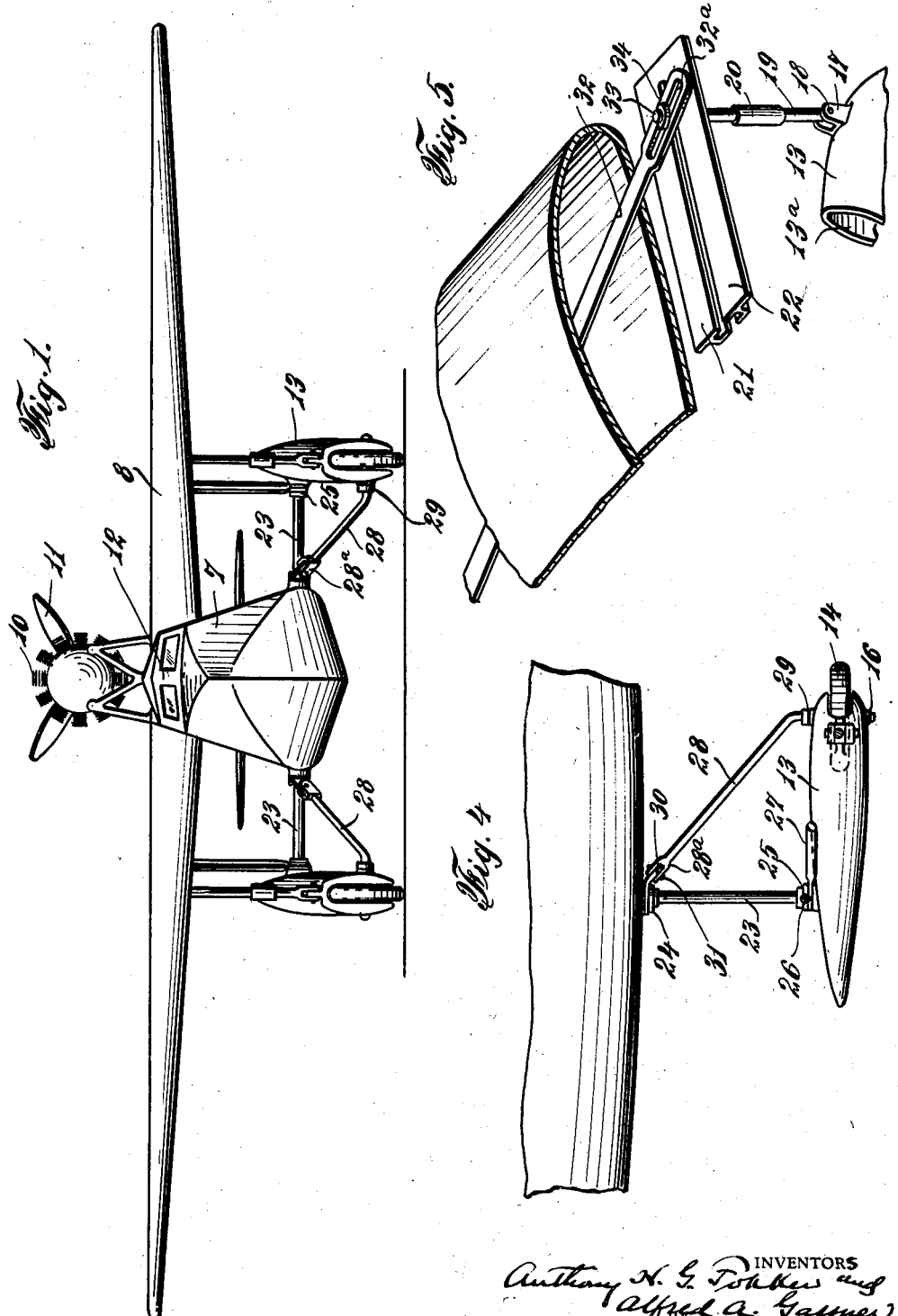

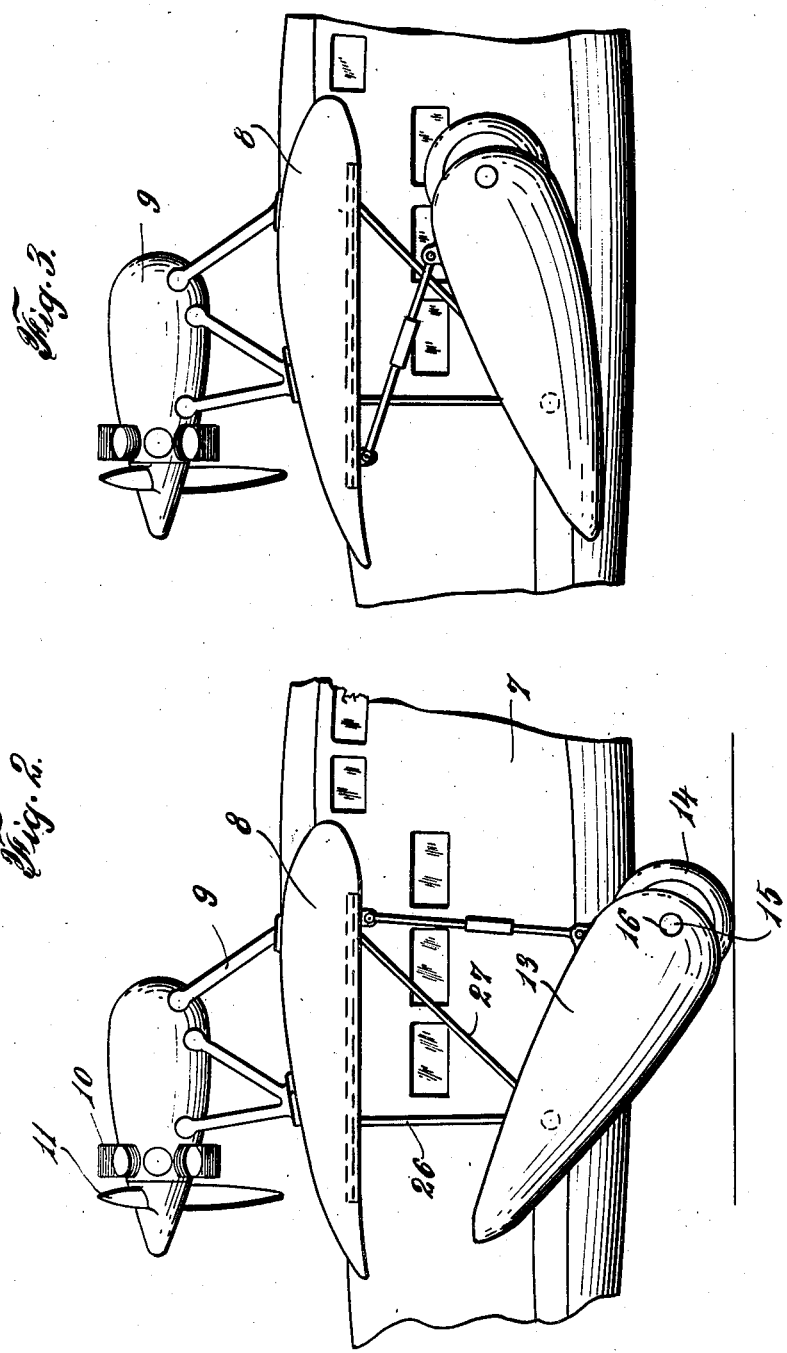

1,765,329

UNITED STATES PATENT OFFICE

ANTHONY H. G. FOKKER, OF TENAFLY, NEW JERSEY, AND ALFRED A. GASSNER, OF NEW YORK, N. Y., ASSIGNORS TO FOKKER AIRCRAFT CORPORATION OF AMERICA, A CORPORATION OF DELAWARE

AMPHIBIAN AIRCRAFT

Application filed September 27, 1928. Serial No. 308,813.

This invention relates generally to aircraft and is more especially directed to improvements in airplanes of the so-called dual-purpose types, particularly those commonly termed amphibians; that is, craft which may take off from or alight on either land or water, as may be desired, or found necessary.

In our co-pending application for Letters Patent of the United States, filed September 27, 1928 Serial No. 308,812, we have pointed out the disadvantages inherent to existing types of dual-purpose aircraft and have shown and described an airplane adapted to take off from or alight upon land or water, as the case may be, under normal conditions of operation, which is designed to overcome such disadvantages, the marine floats or buoyant elements, without the hull, which afford lateral stability to the craft when on the water, being components of a yieldable undercarriage structure which embodies the usual wheels for supporting the airplane from the ground.

As disclosed, in the invention of our aforesaid co-pending application, the floats are directly connected to the hull or body of the craft and form the sole means of bracing the wheel-carrying elements of the undercarriage against lateral and fore and aft thrusts or loads. However, under certain conditions of use, it may be found to be desirable or necessary in incorporating the floats in the undercarriage structure, to support them in a more or less remote relationship to the hull, as by outboard fittings or so-called outrigging.

Therefore, while it is the general object of this invention to retain the many advantages which flow from the practicing of the invention, or inventions, of our aforesaid co-pending application, it is also the purpose hereof, to provide a simple and practical method of meeting such conditions, either structurally or otherwise, as might render the use of the invention, or inventions, of said co-pending application impractical or inexpedient for the attainment of the desired ends.

More specifically, it is the object of this invention to provide a means of utilizing the floats or lateral stabilizing elements of an airplane of the amphibian type, as a supporting unit of the undercarriage structure, which embodies the usual wheels for supporting the craft from the ground, in such manner as to increase its maneuverability, especially when on the water, and permit of the employment of floats corresponding more closely in design to those generally in use in flying boats and amphibians, as at present constructed.

It is also an object of this invention to provide for a wide range of adjustability of the floats, when functioning as lateral stabilizers for the craft when on the water, than is obtainable under present methods of construction, so that the angle of approach may be varied in such degree as may be found necessary to meet tidal or other conditions, when taking off from or alighting on the water, the floats being capable of an arcuate movement on a transverse axis intersecting the longitudinal axis of the hull or body.

Other advantages flowing from the practicing of this invention will become manifest as the description proceeds, and we would have it clearly understood that we reserve unto ourselves all rights to the full range of equivalents, both in structure and in use, to which we may be entitled, within the scope of this disclosure.

While we have elected to illustrate a preferred embodiment of our invention, it will be obvious that other means may be utilized for attaining the several objects to which the invention is directed, as hereinbefore pointed out.

In the drawings:

Figure 1 is a front elevation of an airplane of the amphibian type, embodying my invention.

Figure 2 is a side elevation of the middle or amidship section of the craft shown in Figure 1, illustrating the relative positions of the components of the undercarriage structure, when extended for a ground landing.

Figure 3 is a view similar to Figure 2, showing the positions assumed by the co-operating parts of the undercarriage when the floats are raised to function for alighting on the water.

Figure 4 is a top plan view taken from beneath the wing, of the right hand float and the interconnected parts of the undercarriage, and Figure 5 is an enlarged view in perspective, sectioned to illustrate a means for adjusting the undercarriage structure to its several functioning positions.

Referring now to the drawings in detail, in which like characters of reference are employed to designate similar parts in the several views, 7 indicates the hull or body of the airplane, which may be of any suitable design, such as the boat-type usually employed in amphibian and flying boat construction, and 8 the wing or main supporting surface, which, in this showing, is of the cantilever type and mounted across the top of the hull. A suitable engine mounting 9 carrying a motor 10, which may be of the radial air-cooled type is disposed upon the wing, the craft being driven by a propeller of the pusher form, indicated at 11. Manifestly, a water-cooled motor may be used with a suitable mounting located upon the wing or elsewhere, or in lieu of a single motor, the ship may be multi-engined and driven by tractor screws.

As in the structure shown in our heretofore recited co-pending application, the hull is provided with a suitable cabin or cargo space, the pilot or operator being located within a cockpit or forward compartment, protected by an enclosure 12.

The elements of the undercarriage structure on each side of the hull are identical in design, so that the description of a single float and its cooperating parts will afford a clear understanding of the assembly and mode of operation of the several units and of the structure as a whole.

The float 13 may be of any design suitable to the purpose for which it is intended, preferably of the well-known streamlined or torpedo type, the head end being recessed or chambered to receive and partially house a wheel 14 mounted on the transversely disposed axle 15 having bearings in the opposite sides of said float, as indicated at 16, or which may be mounted in the usual forked supporting member concealed within the float. It will be understood, of course, that the float is so constructed that the provision of the aforesaid recess 13ª will not detract from or impair the buoyant characteristics of the general design.

As will be observed from the drawings, and particularly from Figure 4 thereof, the float 13 is supported in laterally spaced relation to the hull 7 by a preferably streamlined tubular member 23 disposed in a horizontal plane at an angle of approximately 90° to the longitudinal axis thereof. This member is preferably rigid with or non-rotatably fixed to the hull, as at 24, the outer end, from which the float is supported abaft its transverse center line, being connected to the latter by a suitable fitting 25, which will give the structure the requisite stability and permit of a limited rotative or arcuate movement of the float about the longitudinal axis of said member.

Projecting from the top of said float 13, near its forward or head end, is a fitting, which may be an extension of a forked member as aforesaid, embodying the spaced ears 17 apertured to receive a pin 18 carried by the lower end of the strut 19 which comprises preferably telescoping members whose relative movement is governed by a suitable yieldable connection, as a so-called shock absorber, indicated at 20.

Suitably connected to the wing and to the rigid laterally extending member 23, preferably at or adjacent the outer end of the latter, are the vertical tension and compression strut 26 and the diagonal or forwardly inclined bracing strut 27, these struts, with the wing, forming a fixed triangular support for the outer end of the aforesaid member 23 and its suspended load. The forward part of the float 13, supported from the wing by said strut 19, is laterally braced by the radius tube or member 28 connected thereto at or about the inner end of the wheel axle 15, as at 29, and to the inner end of the horizontal member 23, or to the hull 7 adjacent the jointure of said member 23 therewith, through the medium of a suitable fixed eye-fitting 30, to which the yoke end 28ª of said radius tube is pivotally attached by the pin 31.

Mounted transversely of and within the wing, is a slotted plate 21 embodying spaced dependent flanged portions 21ª and 21ᵇ, cooperating to support and provide a guideway for a slidable block or carriage having an extension 22 projecting through the wing, slotted for the purpose, to which the upper end or head 19ª of the strut 19 is pivotally connected, as at 22ª. The aforesaid block or carriage is adapted to be reciprocated within its guideway by any suitable means, preferably concealed within the wing, or within the hull of the craft, as by a lever 32, manually or otherwise actuatable. This lever may be fulcrumed within the wing, the outer end being slotted to ride upon the upstanding threaded lug 33 of the slidable carriage or block, provided with a washer and retaining nut 34. Of course, in lieu of the arrangement shown, a lever with the requisite linkage connections between it and the block or carriage may be employed, it being obvious that the function of the lever 32, or its equivalents, is to provide a medium for moving the block or carriage transversely of the wing, or fore and aft of the craft.

Due to the interconnection of the strut 19 and the aforesaid carriage or block, as described, the movement of the latter in response to the lever action will effect a change in the position of the float 13, relative to the under surface of the wing 8, it being evident that the float will rotate on the longitudinal axis of the rigid member 23, through an arc fixed by the extent of the movement of the lever 32, or other actuating element. As will be apparent, the forward movement of the block or carriage to the limit of its slotted guideway, will project the nose or forward end of the float downwardly, the strut 19 assuming a substantially perpendicular position. Thus, the wheel 14 will be disposed below the horizontal plane of the bottom of the hull 7 for engagement with the ground, so that the undercarriage structure of which the float 13 is a component will function in the usual manner, the landing impacts being absorbed or dissipated by the yieldable means 20, while the undercarriage structure is effectively braced against detrimental side loads by the member 23 and the radius tube 28.

The movement of the carriage or block to the other extremity of its slotted guideway, by the actuation of the lever 32, will result in an upward inclination of the nose of the float 13, the shock absorber strut 19 assuming an oblique position. The float 13 which, when the strut 19 is substantially vertical, forms a supporting medium for the ground-engaging wheel 14 and serves as a fore and aft brace for the undercarriage structure, now is in a position to perform its normal function of counteracting the unbalancing effect of the overhanging wing when the hull is supported upon the water, or of imparting lateral stability to the craft. (See Figure 3.) Obviously, the nose of the float may be raised or lowered to intermediate positions between the two extremes. This admits of such adjustment of the float as may be desired, to change its effective displacement so as to obtain the utmost efficiency in the performance of its stabilizing function under different ship loads and also to provide for meeting varying tidal conditions, while, when the craft is in the air, the resistance or drag of the float may be materially offset by adjustment to the proper angle of approach. Of course, such adjustment is optional with the pilot or crew of the craft, it being clear that the craft may operate efficiently in the air with the float in any of its several positions.

From the foregoing, it will be manifest that we have evolved a simple and highly practical means for supporting an airplane from the ground or for imparting lateral stability thereto, when the craft is upon the water. All of the media essential to the performance of the dual function of the invention are combined in a single structure, which is instantly convertible, at will, to operate as a so-called landing gear, for alighting on a surface other than water, or as a means for cooperating with the hull to maintain the craft in proper equilibrium when in the latter element

What is claimed is:

1. An amphibian airplane, embodying an undercarriage structure for supporting the craft when on the ground, including a float disposed on each side of the hull of the airplane, means rigidly connected to said hull below the wing and to each float for maintaining the latter in spaced relationship to the hull, lateral bracing means rotatably connected to said hull and to said float, tension and compression struts connecting said rigid spacing means to the wing of the airplane, a wheel carried by each of said float and means connected to said floats and actuatable to rotate the same on said rigid spacing means to render said landing wheels or said floats effective as contributory supporting means for the craft, at the option of the operation.

2. An undercarriage for an airplane embodying a pair of marine floats adapted to be maintained in laterally spaced relation to the body of the craft, means for supporting said float abaft its transverse axis from the body of the airplane, means movable relatively to said body and to the float for laterally bracing the forward part of said float from the body, compression and tension struts connected to said supporting means adjacent the float, a wheel rotatably mounted on each float, means connecting the float to the wing and means actuatable to rotate the float upon the longitudinal axis of said supporting means to raise or depress the nose of the float, whereby the floats or the wheels may function as contributory supporting media for the craft.

3. The combination with an airplane, of means for contributing to support said craft when on the ground and when on the water, said means including horizontally disposed tubular members extending outwardly from opposite sides of the body of the airplane, a float, a landing wheel carried by said float, means for rotatably connecting said float to the outer end of a tubular member and means for rotating said float on the longitudinal axis of said member to permit said floats or said wheels, as may be predetermined, to function as contributing supporting means for the airplane.

4. The combination with an airplane, of means for contributing to support said craft when on the ground or from the water, said means including lateral stabilizing floats, each having a wheel mounted therein, the tread of the wheel extending below the lowermost point of the float, a rigid member extending laterally from the body of said airplane, one of said floats being rotatably connected to the outer end thereof, a lateral bracing member connected to said airplane body and to said float for relative movement, means connecting said float to the wing of the airplane and means for actuating said wing and float connecting means to effect the rotation of said float upon said rigid member to present said floats or said wheels, as may be predetermined, as supporting elements for the airplane.

5. An airplane having a body, a wing disposed transversely of the body and means for permitting the airplane to alight upon and take off from the ground or from water, said means including lateral stabilizing floats, each being provided with a wheel housed therein, the tread of the wheel extending below the lowermost point of the float, means for connecting said floats to the body of the airplane for rotation on an axis transverse of said body, means of connection between each of said floats and the wing of the airplane and means in engagement with said latter connecting means and actuatable transversely of said wing to effect rotative movement of said floats, to permit said floats or their respective wheels to function as supporting media for the airplane.

6. An airplane having a body, a wing disposed transversely thereof and means for permitting the airplane to alight upon or take off from land or water, said means including floats laterally supported from said body, each of said floats having a wheel receiving recess, a wheel mounted therein having its tread portion extending below the lowest point of the float, a connecting member between each of said floats and the wing of the airplane and means in engagement with said member and actuatable to shift the position of said member relative to said wing and produce rotative effort to move said floats on their supports to present said floats or said wheels as contributory sustaining media for said airplane.

7. An airplane having a body conforming to the lines of a boat, a wing mounted transversely of said body and means for permitting said airplane to alight upon or take off from land or water, said means including floats, means for supporting said floats laterally of said body for rotative movement on an axis transverse thereof, a wheel carried by each float, means connecting said floats to said body at a point spaced forward of said supporting means and movable relatively to said body and to said floats, a member interposed between each of said floats and the wing and connected thereto and means for effecting movement of the head end of said member in one direction to produce a rotative movement of the float connected thereto to project its wheel tread below the lowest point of the body and in the opposite direction to raise the float and dispose the wheel carried thereby in a horizontal plane above the normal water-line of said airplane body.

8. An amphibian aircraft having a boat-like hull, tubular outriggers supporting lateral stabilizing floats from the opposite sides of said hull, said floats being connected to said outriggers for rotation on an axis extending transversely of said hull, a rigid connection between said outriggers and the wing of the aircraft, a wheel mounted in each float, a tubular member, embodying a yieldable element, connected to each float adjacent its wheel and movably connected to the wing of the aircraft, and means for shifting the position of said member relatively to the wing to rotate said float on its outrigger and raise or lower its nose to a predetermined degree.

9. An amphibian aircraft having a boat-like hull, a wing disposed transversely thereof, lateral stabilizing floats, members rigidly connected to said hull and to said wing for sustaining said floats in laterally spaced relation to said hull, said floats being rotatably connected to said sustaining members at a point abaft their center transverse axes, a member pivotally connected to each of said floats adjacent its nose and in engagement with said wing, and means connected to said member and operable to shift the position of engagement of said member with said wing to rotate the float connected thereto on its sustaining members and raise or lower the nose thereof, as may be predetermined.

ANTHONY H. G. FOKKER.
ALFRED A. GASSNER.